(12) United States Patent
Ebina

(10) Patent No.: US 7,052,269 B2
(45) Date of Patent: May 30, 2006

(54) DIE ASSEMBLY FOR MOLDING OPTICAL DISC SUBSTRATES

(75) Inventor: Toshiyuki Ebina, Ohbu (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 11/023,338

(22) Filed: Dec. 29, 2004

(65) Prior Publication Data
US 2005/0208170 A1 Sep. 22, 2005

(30) Foreign Application Priority Data
Mar. 18, 2004 (JP) ............................. 2004-078109

(51) Int. Cl.
*B29D 11/00* (2006.01)
(52) U.S. Cl. ...................... 425/542; 425/810; 264/1.33
(58) Field of Classification Search ............ 425/192 R, 425/542, 810; 264/1.33, 106
See application file for complete search history.

(56) References Cited

U.S. PATENT DOCUMENTS 5,180,595 A * 1/1993 Kinoshita .................. 425/556
5,626,890 A * 5/1997 Asai .......................... 425/556

FOREIGN PATENT DOCUMENTS

| JP | 08-132488 | 5/1996 |
| JP | 08-315430 | 11/1996 |
| JP | 2000-006170 | * 11/2000 |

* cited by examiner

*Primary Examiner*—Donald Heckenberg
(74) *Attorney, Agent, or Firm*—Browdy and Neimark, PLLC

(57) ABSTRACT

It is an object of the present invention to provide a die assembly for molding optical disc substrates, wherein formation of a burr perpendicular to a reading surface that is opposite to a signal surface of each optical disc substrate can be prevented and two signal surfaces can be bonded together satisfactorily. To that end, in a die assembly for molding optical disc substrates that comprises an outer circumferential stamper holder 25 having: a stamper holding portion 34 that holds an outer circumferential edge portion 26E of a stamper 26 disposed on a specular plate 24; and an inner circumferential portion 33 that defines an outer circumferential end 27E of a molding cavity 27, the inner circumferential portion 33 of the outer circumferential stamper holder is provided with a projecting portion 35 having an acute cross-section that consists of a smooth surface projecting into the molding cavity 27 toward the stamper holding portion 34.

1 Claim, 7 Drawing Sheets

DIE ASSEMBLY FOR MOLDING OPTICAL DISC SUBSTRATES

BACKGROUND OF THE INVENTION

1. Field of the Invention

The present invention relates to a die assembly for molding optical disc substrates and, in particular, it relates to a die assembly for molding optical disc substrates that comprises an outer circumferential-stamper holder having: a stamper holding portion that holds an outer circumferential edge portion of a stamper disposed on a specular plate; and an inner circumferential portion that defines an outer circumferential end of a molding cavity.

2. Description of the Related Art

FIG. 5 and FIG. 6, which is an enlarged view of a part enclosed by a circle 6 in FIG. 5, show an example of a conventional die assembly 100 for molding an optical disc substrate Mp. This die assembly 100 is comprised of a stationary die 11 and a movable die 200. The stationary die 11 comprises: a stationary die plate 13 that is attached to a stationary platen (not shown) of an injection molding machine via a thermal insulation plate 14; a stationary specular plate 16 that is fastened to a surface of the stationary die plate 13, which is opposite to that for attaching the thermal insulation plate 14, via a stationary back plate 15; a gate insert 19 that are inserted through center openings of the stationary die plate 13, the stationary back plate 15 and the stationary specular plate 16; a sprue bush 18 and a positioning plate 17; and a stationary outer circumferential ring 12 that is inserted around outer circumferential end faces of the stationary back plate 15 and the stationary specular plate 16 and fastened to the stationary die plate 13.

The movable die 200 comprises: a movable die plate 22; a movable specular plate 24 that is fastened to a surface of the movable die plate 22 toward the stationary die 11 via a movable back plate 23; a stamper 26 that is disposed on a surface of the movable specular plate 24 faced by the stationary specular plate 16; an outer circumferential stamper holder 250 that pinches an outer circumferential edge portion of the stamper 26 to allow the movable specular plate 24 to hold the stamper 26; an inner circumferential stamper holder 28 that is movably inserted through center openings of the movable back plate 23 and the movable specular plate 24 and that pinches an inner circumferential end of the stamper 26 to allow the movable specular plate 24 to hold the stamper 26; a stationary sleeve 29 that guides an internal hole of the inner circumferential stamper holder 28 and that is fastened to the movable die plate 22; an ejector 30 that is inserted through an internal hole of the stationary sleeve 29 slidably in the axial direction; a male cutter 31 that is inserted through an internal hole of the ejector 30 slidably in the axial direction; an ejector pin 32 that is inserted through an internal hole of the male cutter 31 slidably in the axial direction; and a movable outer circumferential ring 21 that is inserted around outer circumferential end faces of the movable back plate 23 and the movable specular plate 24 and fastened to the movable die plate 22. As the stationary outer circumferential ring 12 and the movable outer circumferential ring 21 abut against each other, the movable die 200 is aligned with the stationary die 11 described above to constitute the die assembly 100 and form a molding cavity 270 therebetween.

As shown in the enlarged cross-sectional view of FIG. 6, the outer circumferential stamper holder 250 has: a stamper holding portion 340 that holds the outer circumferential edge portion 26E of the stamper 26 disposed on the movable specular plate 24; and an inner circumferential portion 330 that defines an outer circumferential end 270E of said molding cavity 270. Then, the inner circumferential portion 330 has a surface 330S that has a linear cross-section extending from a recessed portion 41 opposed to a protruding portion 40 of the stationary specular plate 16. In this connection, the inner circumferential surface 330S may have a relatively small step portion having a height and width of 0.1–0.5 mm, as described in Japanese Unexamined Patent Publication No. H08-132488. When the optical disc substrate Mp is molded in the molding cavity 270 of the die assembly 100 configured as described above, melted resin permeates through a clearance D of about 5–10 im between the protruding portion 40 and the recessed portion 41 to form a burr 36. The burr 36 may fall off in the process after the optical disc substrate Mp is molded to cause contamination or, further, it may obstruct printing on a reading surface that is opposite to a signal surface to which information is transferred by the stamper 26 for the optical disc or it may spoil a feeling when a user touches the optical disc by hand. This problem may be solved by reducing the clearance D of about 5–10 im between the protruding portion 40 and the recessed portion 41 or by reducing the inclination angle C of the protruding portion 40 and the recessed portion 41 but, in this case, another problem occurs in that galling is likely to occur between the protruding portion 40 and the recessed portion 41.

Further, as shown in FIG. 7, when an optical disc Mpo is manufactured by bonding the signal surfaces of such optical disc substrates Mp, Mp together, there is a problem in that an adhesive or UV lacquer G leaks through the interface between the bonded surfaces to spoil appearance. In order to address this problem, Japanese Unexamined Patent Publication No. H08-315430 discloses a method in which optical disc substrates are molded with step portions to solve this problem by the die assembly disclosed in Japanese Unexamined Patent Publication No. H08-132488 and, then, are bonded together. However, the method using such step portions cannot prevent the leakage of the UV lacquer G entirely.

BRIEF SUMMARY OF THE INVENTION

The present invention is made to solve the above problems and it is an object of the present invention to provide a die assembly for molding optical disc substrates, wherein formation of a burr perpendicular to a reading surface that is opposite to a signal surface of each optical disc substrate can be prevented and two signal surfaces can be bonded together satisfactorily.

In order to achieve the above object, according to the present invention, there is provided a die assembly for molding optical disc substrates that comprises an outer circumferential stamper holder having: a stamper holding portion that holds an outer circumferential edge portion of a stamper disposed on a specular plate; and an inner circumferential portion that defines an outer circumferential end of a molding cavity, wherein the inner circumferential portion of said outer circumferential stamper holder is provided with a projecting portion having an acute cross-section that consists of a smooth surface projecting into said molding cavity toward said stamper holding portion.

DETAILED DESCRIPTION OF THE INVENTION

Figure 1:
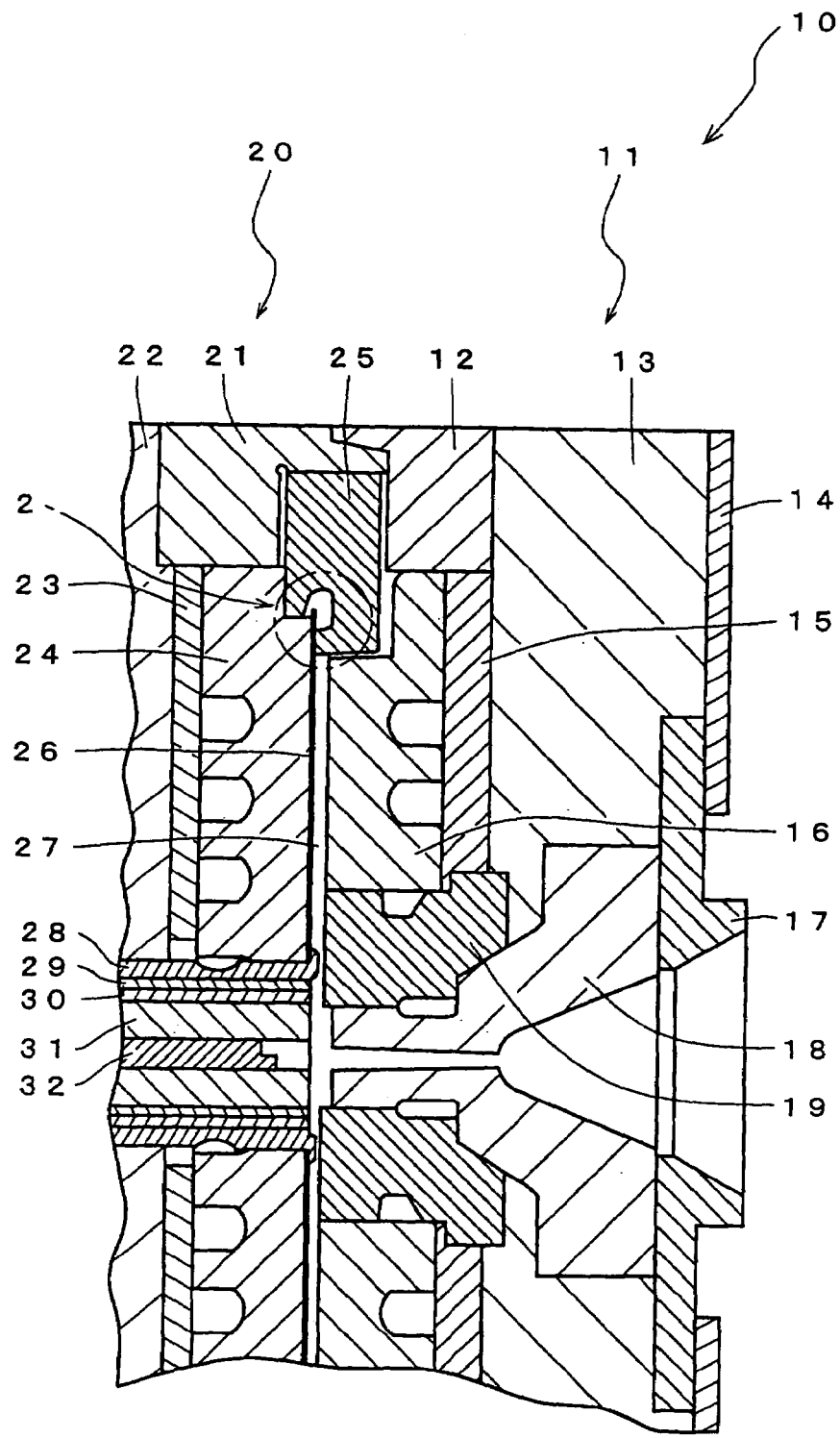
FIG. 1 is a cross-sectional view showing an important part of an embodiment of a die assembly for molding optical disc substrates.

An embodiment of the present invention will be described in detail with reference to the drawings. As shown in FIG. 1, an die assembly 10 according to this embodiment is comprised of a stationary die 11 and a movable die 20. The stationary die 11 is configured similarly to that in the conventional die assembly described above and comprises: a stationary die plate 13 that is attached to a stationary platen (not shown) of an injection molding machine via a thermal insulation plate 14; a stationary specular plate 16 that is fastened to a surface of the stationary die plate 13, which is opposite to that for attaching by the thermal insulation plate 14, via a stationary back plate 15; a gate insert 19 that are inserted through center openings of the stationary die plate 13, the stationary back plate 15 and the stationary specular plate 16; a sprue bush 18 and a positioning plate 17; a stationary outer circumferential ring 12 that is inserted around outer circumferential end faces of the stationary back plate 15 and the stationary specular plate 16 and fastened to the stationary die plate 13; and other elements.

The movable die 20 comprises: a movable die plate 22; a movable specular plate 24 that is fastened to a surface of the movable die plate 22 toward the stationary die 11 via a movable back plate 23; a stamper 26 that is disposed on a surface of the movable specular plate 24 faced by the stationary specular plate 16; an outer circumferential stamper holder 25 that pinches an outer circumferential edge portion of the stamper 26 to allow the movable specular plate 24 to hold the stamper 26; an inner circumferential stamper holder 28 that is movably inserted through center openings of the movable back plate 23 and the movable specular plate 24 and that pinches an inner circumferential end of the stamper 26 to allow the movable specular plate 24 to hold the stamper 26; a stationary sleeve 29 that guides an internal hole of the inner circumferential stamper holder 28 and that is fastened to the movable die plate 22; an ejector 30 that is inserted through an internal hole of the stationary sleeve 29 slidably in the axial direction; a male cutter 31 that is inserted through an internal hole of the ejector 30 slidably in the axial direction; an ejector pin 32 that is inserted through an internal hole of the male cutter 31 slidably in the axial direction; a movable outer circumferential ring 21 that is inserted around outer circumferential end faces of the movable back plate 23 and the movable specular plate 24 and fastened to the movable die plate 22; and other elements. As the stationary outer circumferential ring 12 and the movable outer circumferential ring 21 abut against each other, the movable die 20 is aligned with the stationary die 11 described above to constitute the die assembly 10 and form a molding cavity 27 therebetween.

Figure 2:
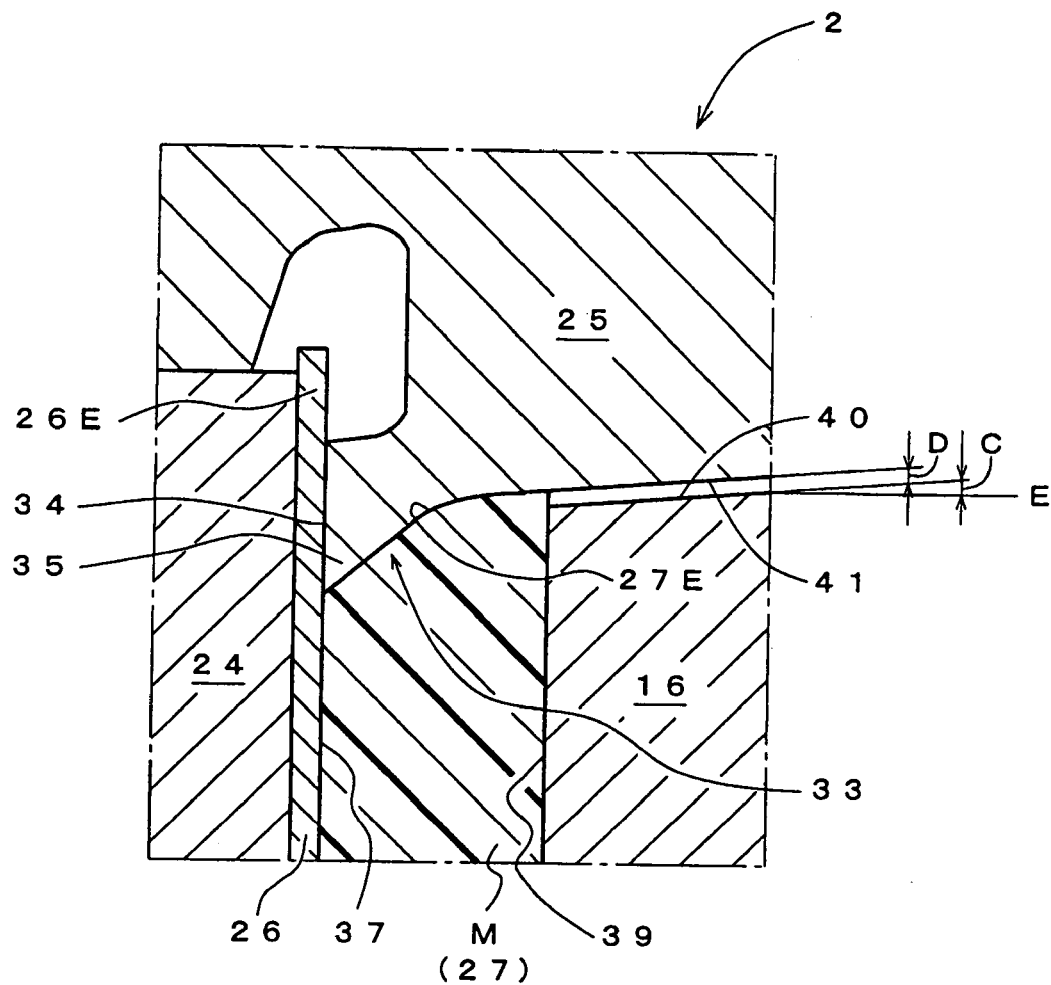
FIG. 2 is an enlarged view of a part enclosed by a circle 2 in FIG. 1.

As shown in FIGS. 1 and 2, the molding cavity 27 is defined and formed by: a surface of the stamper 26; a circular surface 39 of the stationary specular plate 16; an inner circumferential portion 33 of the outer circumferential stamper holder 25; and end faces of the gate insert 19, the sprue bush 18, the inner circumferential stamper holder 28, the stationary sleeve 29, the ejector 30, the male cutter 31 and the ejector pin 32. Then, when an injection unit of an injection molding machine (not shown) abuts against the sprue bush 18, melted resin is injected to fill the molding cavity 27 and, then, cooled and hardened so that an optical disc substrate M is molded.

The stamper 26 forms a signal surface 37 of the optical disc substrate M, to which innumerable minute protrusions formed in a specific area of the stamper 26 are transferred. On the other hand, the circular surface 39 of the stationary specular plate 16 and the end face of the gate insert 19 form a smooth reading surface 38 on the opposite side of the signal surface 37. Printing or other treatment may be applied to all or a part of the reading surface 38. Further, the inner circumferential portion 33 of the outer circumferential stamper holder 25 forms an outer circumferential end of the molding cavity 27 so that an outer circumferential end face of the optical disc substrate M is defined and formed.

As shown in the enlarged cross-sectional view of FIG. 2, the outer circumferential stamper holder 25 is an annular member having a stamper holding portion 34 and the inner circumferential portion 33. An annular surface of the stamper holding portion 34 abuts against the surface of the outer circumferential edge portion 26E and holds the stamper 26 disposed on a surface of the movable specular plate 24 in cooperation with the inner circumferential stamper holder 28. The inner circumferential portion 33 defines an outer end 27E of the molding cavity 27 as described above and it extends toward the stationary die 11 to form a recessed portion 41. When the stationary die 11 and the movable die 20 are aligned with each other, this recessed portion 41 opposes a protruding portion 40 provided as an elevated stage on the stationary specular plate 16 toward the molding cavity 27 with a clearance D of 5–10 im. The recessed portion 41 and the protruding portion 40 are inclined toward the outer circumferential side of the molding cavity 27 by an angle C with respect to an axis line E perpendicular to the circular surface 39 of the stationary specular plate 16. When the optical disc substrate M is molded, so-called injection compression molding is performed in which the melted resin is injected into the molding cavity 27 before the alignment of the die assembly 10 is completed or, in other words, before the stationary outer circumferential ring 12 and the movable outer circumferential ring 21 abut against each other and, thereafter, the movable die 20 is brought nearer to the stationary die 11. In this case, as the angle C is increased, the clearance D is also increased. Therefore, the angle C is set to 2–8° that is sufficiently large to prevent galling when the protruding portion 40 enters inside the recessed portion 41 and sufficiently small so that the melted resin is not likely to permeate through the clearance D when the melted resin is compressed. In this connection, both or either one of the protruding portion 40 and the recessed portion 41 may have a stepped configuration.

Figure 3:
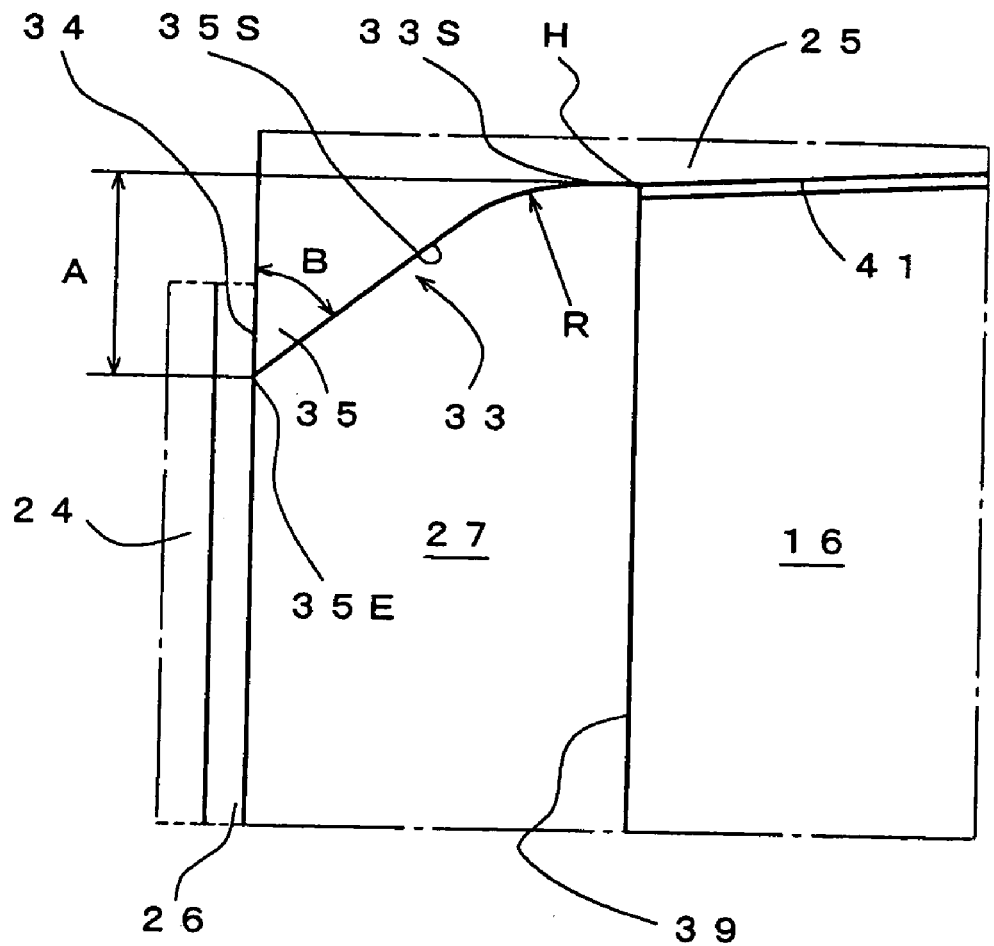
FIG. 3 is a diagram for explaining a configuration of an important part of an outer circumferential stamper holder shown in FIG. 2.

As can be seen from the explanatory diagram of FIG. 3, the inner circumferential portion 33 is a surface portion that includes a surface 35S of a projecting portion 35 projecting into the molding cavity 27 from a surface 33S, which, in turn, extends from the recessed portion 41 to have a linear cross-section. The projecting portion 35 is provided on the side of the stamper holding portion 34 in the inner circumferential portion 33 and represents a smooth surface projecting into the molding cavity 27 toward the stamper holding portion 34 to form an acute cross-section. As shown in FIG. 3, in the cross section of the inner circumferential portion 33, the surface 35S of the projecting portion 35 consisting of an acute-angle portion having an angle B and the surface 33S extending from the recessed portion 41 are smoothly connected with each other with a curvature radius R. Therefore, the surface of the inner circumferential portion 33 is a smooth curved surface without unevenness extending from a position H opposite to an end of the circular surface 39 of the stationary specular plate 16 to a tip 35E of the projecting portion 35.

Further, chrome plating is applied to the surfaces of the inner circumferential portion 33 and the recessed portion 41 to increase flowability of the melted resin and releasability of the optical disc substrate M. In this connection, the position H in the inner circumferential portion 33 that is opposite to an end portion of the circular surface 39 of the stationary specular plate 16 corresponds to the outermost circumference of the molding cavity 27 and the diameter of the molding cavity 27 is defined by adding an amount of shrinkage of the melted resin upon cooling to 120±0.3 mm, which is the specified outer diameter of the optical disc Mo such as a DVD and the like. Then, when the optical disc Mo is a DVD, the thickness of the optical disc substrate M is 0.6 mm and, therefore, the thickness of the molding cavity 27 is defined by adding an amount of shrinkage of the melted resin upon cooling to 0.6 mm. An amount of projection A is a distance between the tip 35E of the projecting portion 35 and the position H along the surface of the stamper 26 and it is set to a range so that its maximum value corresponds to the outermost limit position according to standards to allow formation of signal pits on the signal surface 37 and its minimum value even allows the effect of the projecting portion 35 to be exhibited. Further, it is preferable that the acute cross-sectional angle B is in the range of 30–60°, said amount of projection A is in the range of 0.2–1 mm, and said curvature radius R is in the range of 0.1–0.8 mm. Thus, when values in said ranges are selected, the formation of the burr perpendicular to the reading surface that is opposite to the signal surface of the optical disc substrate can be prevented and the two signal surfaces can be bonded together more satisfactorily while observing the standards for optical discs.

Figure 6:
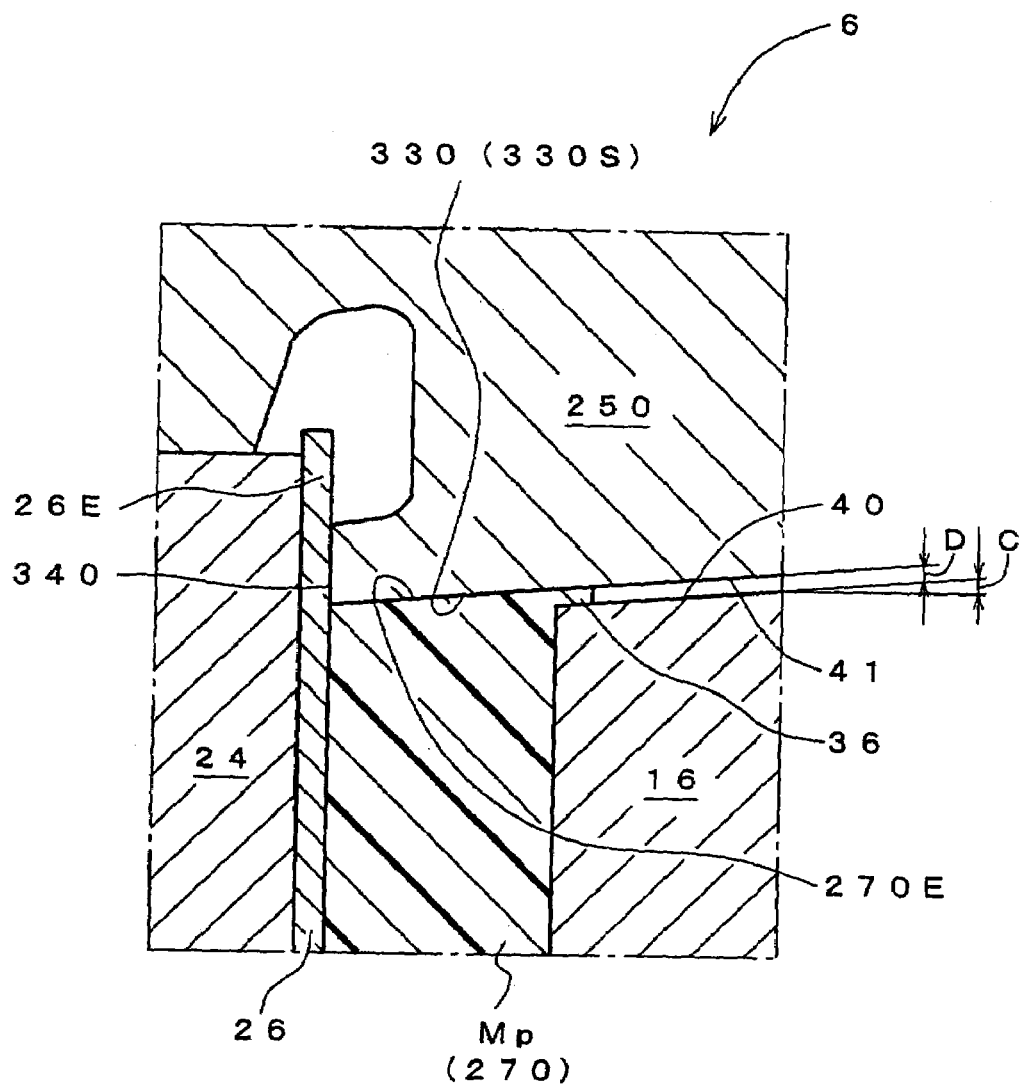
FIG. 6 is an enlarged view of a part enclosed by a circle 6 in FIG. 5.
Figure 7:
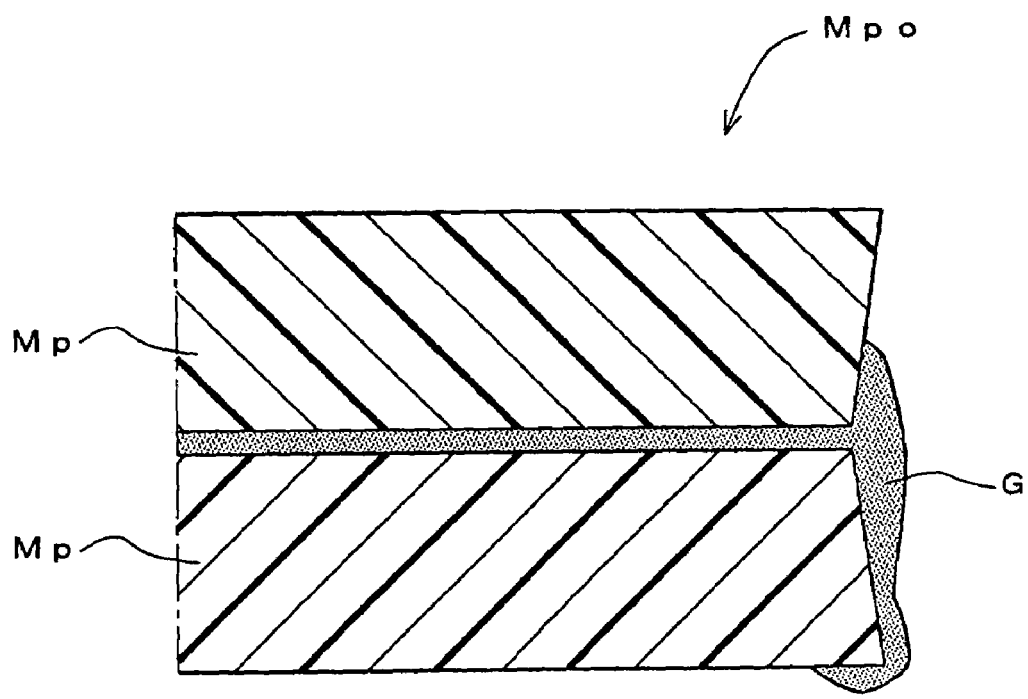
FIG. 7 is a cross-sectional view showing an important part of an optical disc in which the optical disc substrates molded in the conventional die assembly are bonded together.

When the optical disc substrate M is melted by the die assembly 10 described above, as shown in FIGS. 2 and 6, the melted resin does not permeate through the clearance D and the burr is not formed even if the dimensions of the clearance D are identical to those in the conventional die assembly 100. The reason is assumed to be that, when the melted resin is compressed, the flowing melted resin is guided smoothly and cooled effectively by the surface 35S of the projecting portion 35 formed in the inner circumferential portion 33 and, therefore, melted resin having a reduced viscosity reaches the position H earlier.

Figure 4:
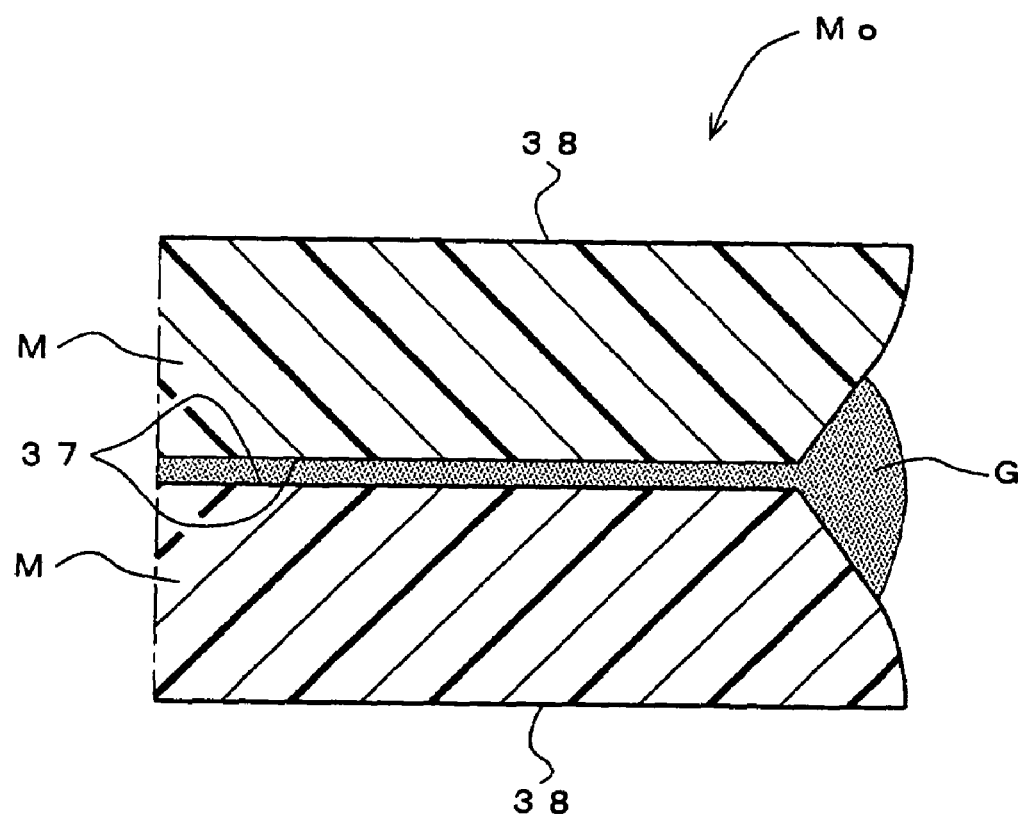
FIG. 4 is a cross-sectional view showing an important part of an optical disc in which the optical disc substrates molded in the die assembly according to the embodiment are bonded together.
Figure 5:
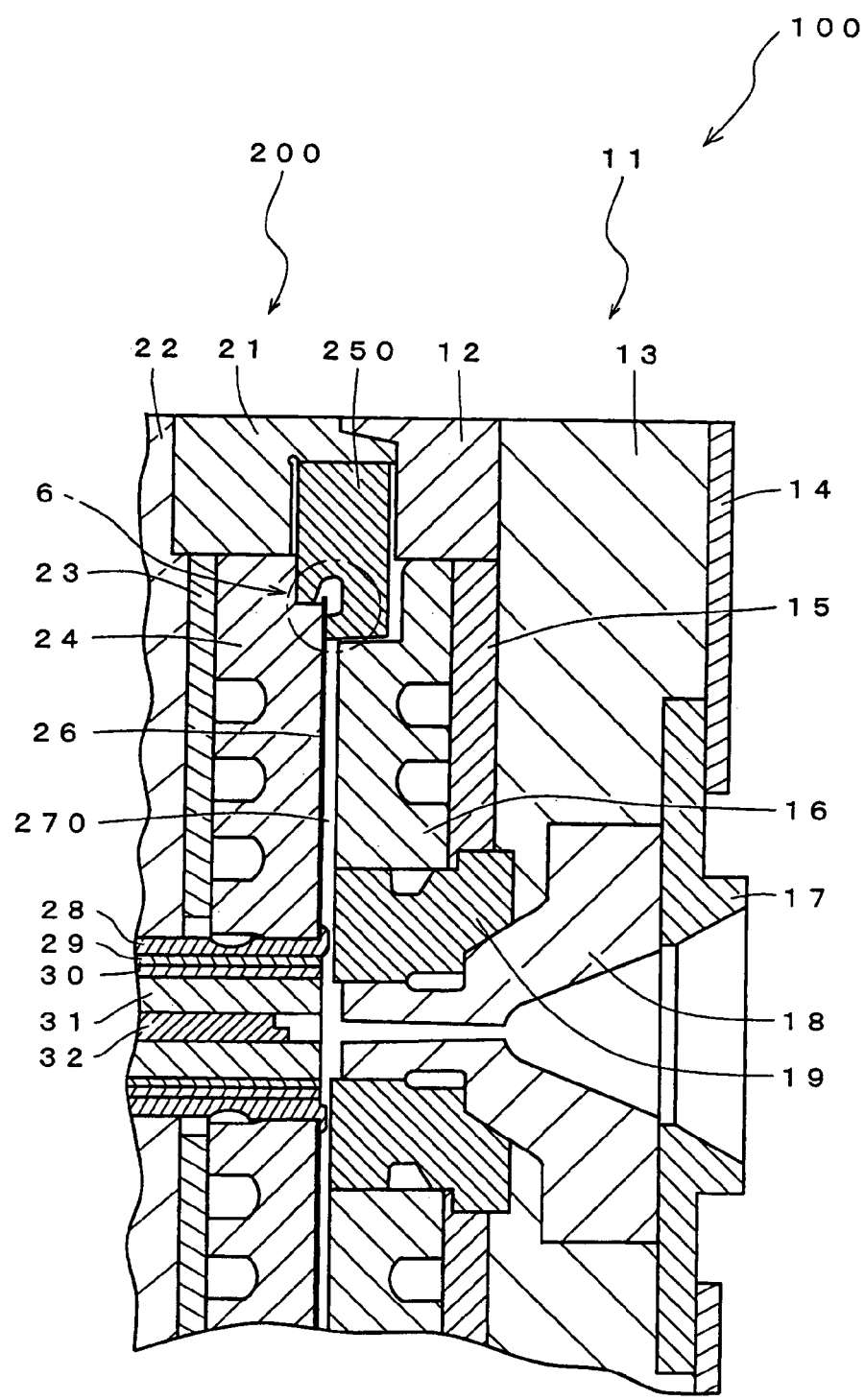
FIG. 5 is a cross-sectional view showing an important part of an example of a conventional die assembly for molding optical disc substrates.

Reflective layers are formed, by vacuum deposition, on each signal surface 37 of the optical disc substrates M, Mmolded as described above and, then, two signal surfaces are bonded together by an adhesive or UV lacquer G to make the optical disc Mo, as shown in FIG. 4. In this case, when the optical disc substrates M, M are arranged horizontally and bonded together, the adhesive or UV lacquer G does not leak out from a V cross-sectional groove formed by said projecting portion 35. Thereafter, the printing or other treatment may be applied to the reading surface 38 of one of the optical disc substrate M if a signal substrate 37 of the substrate M does not contain signals, wherein the printing process is not obstructed because there is no burr on the outer circumferential end of the reading surface 38 perpendicular to the reading surface 38.

The present invention may be embodied with various changes, modifications or improvements based on the knowledge of those skilled in the art. Further, it is to be understood that embodiments with said changes fall within the scope of the present invention so long as they are within the spirit of the present invention. For example, though the stamper is disposed on the movable die in the die assembly in the embodiment of the present invention described above, the stamper may be disposed on the stationary die.

What is claimed is:

1. A die assembly, for molding optical disc substrates, that comprises an outer circumferential stamper holder having:
   a stamper holding portion that holds an outer circumferential edge portion of a stamper disposed on a specular plate; and
   an inner circumferential portion that defines an outer circumferential end of a molding cavity,
   wherein the inner circumferential portion of said outer circumferential stamper holder is provided with a projecting portion having an acute cross-section that consists of a smooth surface projecting into said molding cavity toward said stamper holding portion,
   wherein an acute cross-sectional angle of said projecting portion is 30–60°,
   an amount of projection of said projecting portion from the outermost circumference of said molding cavity is 0.2–1 mm, and
   a curvature radius of a smoothly formed surface of said inner circumferential portion is 0.1–0.8 mm.

* * * * *